June 4, 1968     D. CLEJAN     3,386,688
AIRCRAFT PROVIDED WITH AN ENGINE AND
A RETRACTABLE FAIRING THEREFOR Filed March 2, 1966     4 Sheets-Sheet 1

INVENTOR
DEODAT CLEJAN
BY
Prangley, Baird, Claytor,
Miller & Vogel
ATTYS.

June 4, 1968  D. CLEJAN  3,386,688
AIRCRAFT PROVIDED WITH AN ENGINE AND
A RETRACTABLE FAIRING THEREFOR
Filed March 2, 1966  4 Sheets-Sheet 2

United States Patent Office 3,386,688
Patented June 4, 1968

3,386,688
AIRCRAFT PROVIDED WITH AN ENGINE AND
A RETRACTABLE FAIRING THEREFOR
Deodat Clejan, Chicago, Ill., assignor to Pulse
Jet Corporation, a corporation of Delaware
Filed Mar. 2, 1966, Ser. No. 531,101
5 Claims. (Cl. 244—53)

ABSTRACT OF THE DISCLOSURE

There is disclosed an aircraft having a fuselage within which is mounted a main engine driving a propeller to provide the primary motive power therefor, a pair of pulse jet engines fixedly mounted on the fuselage exteriorly thereof and disposed in the air stream of the aircraft in flight to provide auxiliary motive power therefor, the pulse jet engines each including intake air nozzle structure and exhaust gas nozzle structure, first fairings respectively associated with the intake air nozzle structures and movable between a fairing relation with the associated pulse jet engine and a storage position disposed in the fuselage, second fairings respectively associated with the exhaust gas nozzle structures and movable between a fairing relation with the associated pulse jet engine and a storage position disposed in the fuselage, and a controller for governing the movement of the fairings between the positions thereof.

---

The present invention relates to an aircraft provided with an auxiliary engine of the pulse jet type and a retractable fairing therefor, and more particularly to such an aircraft that is normally operated by a propeller driven by a main engine of any suitable type and that may be operated when desired by the auxiliary engine.

In U.S. Patent No. 3,134,561, granted on May 26, 1964 to Deodat Clejan, there is disclosed an aircraft that comprises a main engine, normally of the internal combustion type, a propeller driven by the main engine, an auxiliary engine of the pulse jet type, and facility for moving the auxiliary engine between an active position disposed exteriorly of the fuselage of the aircraft and in the air stream thereof and a storage position disposed interiorly of the fuselage of the aircraft and out of the air stream thereof when the aircraft is in flight.

While this arrangement is entirely satisfactory in operation, it has been found desirable to employ a pulse jet engine in the operation of the aircraft that is of substantial size, so that the moving thereof between active and storage positions involves more complicated mechanism than is desirable; and also, it has been found highly advantageous to employ two such pulse jet engines so that the provision of the mechanisms for selectively moving the engines is altogether too expensive for the desired purpose.

Accordingly, it is a general object of the present invention to provide in an aircraft including an elongated longitudinally extending fuselage, and laterally extending wing structure carried by the fuselage, the combination comprising an engine carried by the fuselage exteriorly thereof and disposed in the air stream of the aircraft in flight, a fairing adapted selectively to cooperate with the engine, means mounting the fairing upon the fuselage for selective movements between active and storage positions, and means for selectively moving the fairing between its active and storage positions, wherein the fairing in its active position is disposed exteriorly of the fuselage and in fairing relation with the engine, and wherein the fairing in its storage position is disposed interiorly of the fuselage and in non-fairing relation with the engine.

Another object of the invention is to provide an aircraft of the type described, wherein the same also comprises a main engine of any suitable type and a propeller driven by the main engine and normally operative to propel the aircraft, and wherein the previously mentioned engine is an auxiliary engine of the pulse jet type and operative to propel the aircraft, when desired, and particularly in the event of failure of the main engine.

A further object of the invention is to provide an aircraft of the type described, that comprises two auxiliary engines carried by the fuselage exteriorly thereof and in the air stream of the aircraft in flight, wherein each of the auxiliary engines is of the pulse jet type, and further comprising two of the fairings carried by the fuselage and respectively cooperating with the auxiliary engines and selectively movable between active and storage positions with respect to the respective auxiliary engines.

A further object of the invention is to provide in an aircraft of the type described, an improved arrangement of the mechanisms for selectively moving the respective fairings, so that the movements thereof between their respective active and storage positions are in substantial unison.

A still further object of the invention is to provide in an aircraft of the type described, fairings of improved and simplified construction and arrangement for an engine of the pulse jet type.

Further features of the invention pertain to the particular arrangement of the elements of the aircraft, whereby the above-outlined and additional operating features thereof are attained.

The invention, both as to its organization and method of operation, together with further objects and advantages thereof, will best be understood by reference to the following specification, taken in connection with the accompanying drawings, in which.

Figure 1:
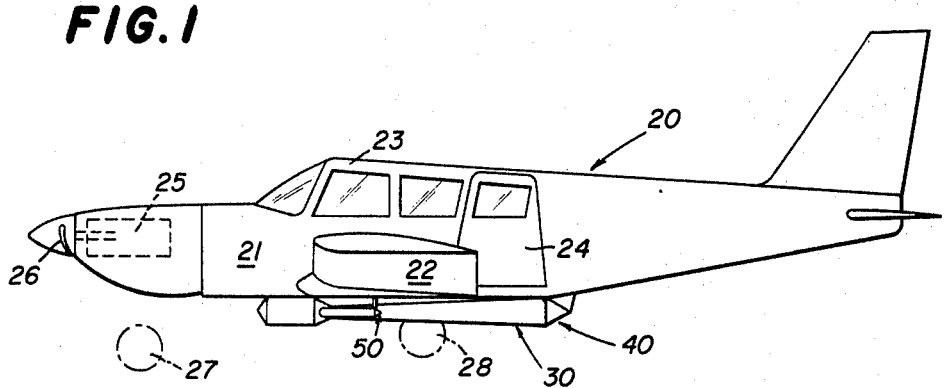
FIGURE 1 is a side elevational view of an aircraft of the low mono-wing type incorporating a pulse jet engine and a retractable fairing therefor, and embodying the present invention.
Figure 2:
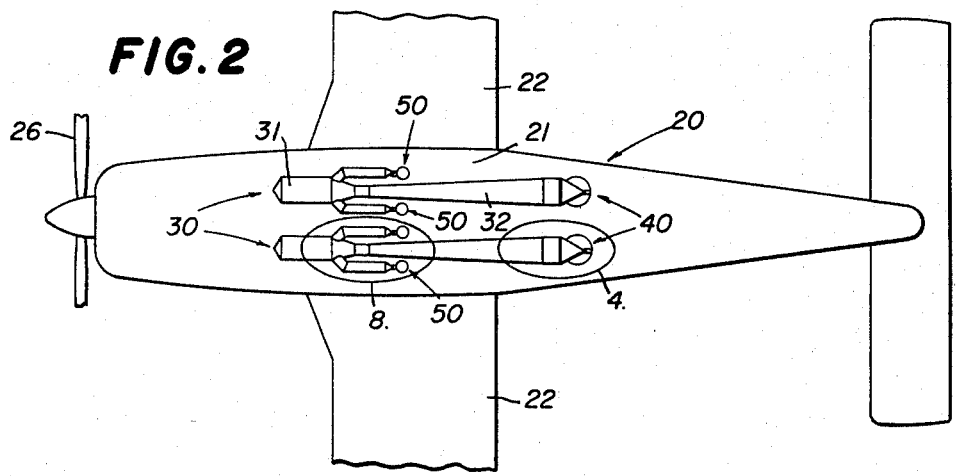
FIG. 2 is a bottom view, partly broken away of the aircraft, as shown in FIG. 1.
Figure 3:
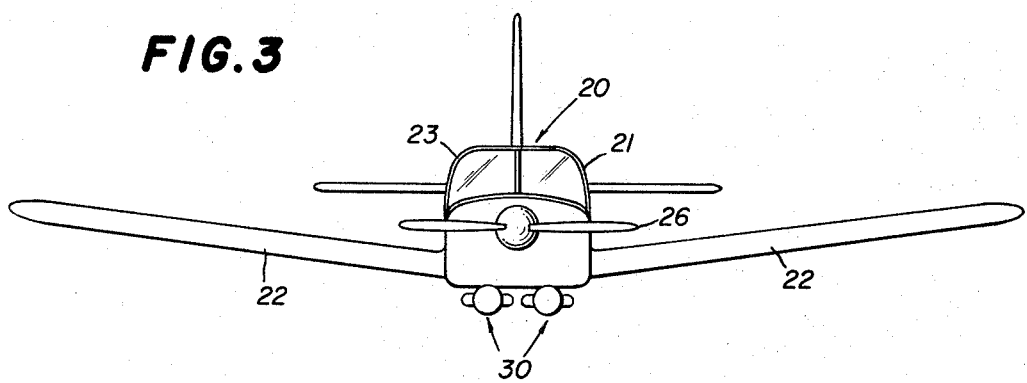
FIG. 3 is a front elevational view of the aircraft, as shown in FIG. 1.

Referring now to FIGS. 1 to 3, inclusive, the aircraft 20 there illustrated and embodying the features of the present invention is of the low mono-wing type comprising an elongated longitudinally extending fuselage 21 and a pair of oppositively laterally extending wing sections 22 respectively carried by the opposite sides of the fuselage 21 and disposed adjacent to the forward central portion thereof. The front portion of the fuselage 21 defines a cabin section 23 that is accessible via a pair of side doors 24 respectively disposed in the sides of the central portion of the fuselage 21 and just rearwardly of the roots of the wing sections 22. The front end of the fuselage 21 houses a main engine 25 of any suitable type, but normally of the internal combustion piston type, that drives a propeller 26 disposed somewhat forwardly of the extreme front end of the fuselage 21. Also, the fuselage 21 carries the usual landing gear, including the landing wheels, indicated at 27 and 28 in FIG. 1; which landing gear accommodates movements of the landing wheels 27 and 28 between projected active positions and withdrawn storage positions, all in a conventional manner.

Also, the aircraft 20 comprises a pair of auxiliary engines 30 of the pulse jet type and carried by the bottom of the fuselage 21 and located between the roots of the wing sections 22 and disposed in side-by-side relation and extending in the longitudinal direction and positioned on opposite sides of the longitudinally extending vertical plane of symmetry of the aircraft 20. The two auxiliary engines 30 are disposed in the air stream of the aircraft 20 in flight; and preferably, the auxiliary engines 30 are identical and of the construction and arrangement of that disclosed and claimed in the copending application of René Malroux, Ser. No. 493,324, filed Oct. 6, 1965, now Patent No. 3,354,650, granted Nov. 28, 1967.

Figure 8:
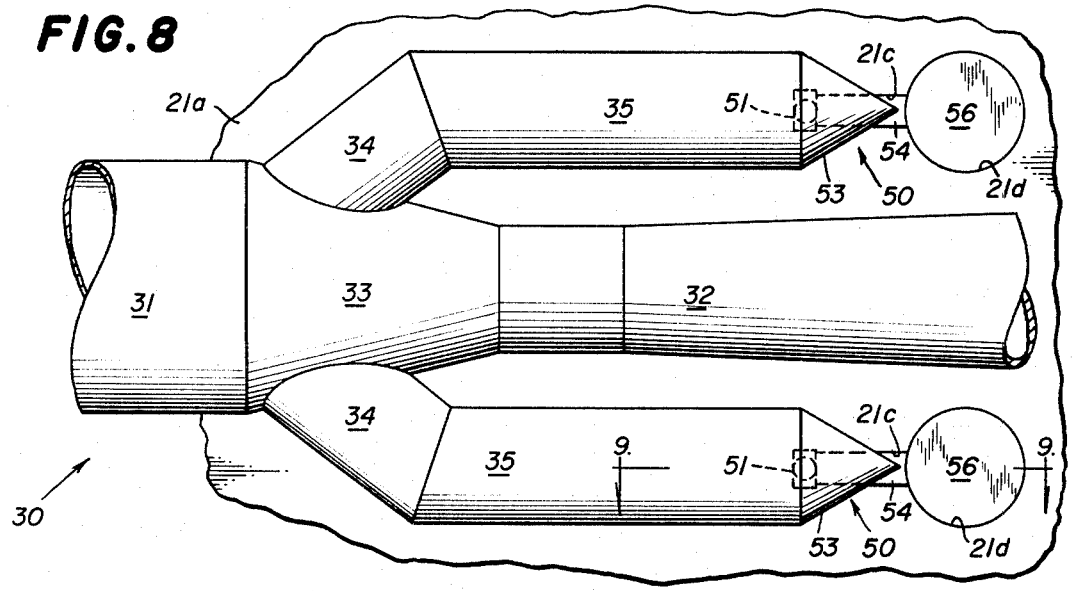
FIG. 8 is an enlarged bottom view, partly broken away, of parts of the aircraft, as shown in the enclosed area 8 in FIG. 2.

Thus, each of the auxiliary engines 30 essentially comprises an elongated longitudinal extending tubular body shell 31 defining a main combustion chamber therein, and an elongated longitudinally extending tubular exhaust gases tail pipe 32 positioned rearwardly of the body shell 31 and in longitudinal alignment therewith. The front end of the body shell 31 is closed by a forwardly tapered cone-like cap; the rear end of the body shell 31 communicates directly with the front end of the exhaust gases tail pipe 32; and the rear end of the exhaust gases tail pipe 32 is open to the atmosphere. As best shown in FIG. 8, the rear end of the body shell 31 comprises a rearwardly converging section 33 to which the front end of the exhaust gases tail pipe 32 is connected; which section 33 is also connected to a pair of tubular arms 34 that extend laterally outwardly from the opposite sides of the section 33; and which arms 34 also project rearwardly and are respectively connected to a pair of intake air tubes 35 that are respectively disposed on opposite sides of the exhaust gases tail pipe 32. In the arrangement, the centerlines of the two intake air tubes 35 are substantially parallel to each other and to the centerline of the exhaust gases tail pipe 32, and the centerlines of the body shell 31 and the exhaust gases tail pipe 32 are aligned with each other and are substantially parallel to the vertical plane of symmetry of the aircraft 20.

As disclosed in the Malroux application, in the operation of the pulse jet engine 30, air is taken into the main combustion chamber defined in the body shell 31, via the section 33 and through the two arms 34 in parallel relation, the air being supplied from the atmosphere via the two intake air tubes 35 into the respective arms 34. Vaporized liquid fuel is injected into the arms 34 adjacent to the junctions thereof with the section 33, whereby the combustible mixture is drawn through the section 33 into the main combustion chamber defined in the body shell 31; with the result that the mixture is exploded by the residual hot gases in the main combustion chamber. The expanding gases proceed rearwardly through the section 33 and via the exhaust gases tail pipe 32 to the atmosphere. Also some of the exhaust gases proceed from the interior of the section 33 via the arms 34 and the intake air tubes 35 to the atmosphere. As the main body of the burning gases proceeds through the exhaust gases tail pipe 32, a subatmospheric pressure develops in the section 33, so that intake air is again drawn through the intake air tubes 35 and the section 33 into the main combustion chamber defined in the body shell 31, thereby to initiate another cycle of operation of the engine 30. Hence, the engine 30 operates automatically on a periodic basis, this engine requiring no valves whatsoever to achieve its pulse jet cycle of operation.

In a constructional example of the engine 30, as disclosed in Malroux application, the frequency of the same may be about 80 cycles per second and the average forward thrust of the same may be about 250 pounds, when burning ordinary gasoline. The engine 30 has a total weight of only about 37 pounds, has an overall length of about 2730 mm., and the body shell 31 has a diameter of about 240 mm. The other dimensions of the elements of the engine 30 are related to those noted substantially in accordance with the scale of the drawings of FIGS. 1 to 3, inclusive; and further, these dimensions are set forth with particularity in the Malroux application mentioned.

Figure 4:
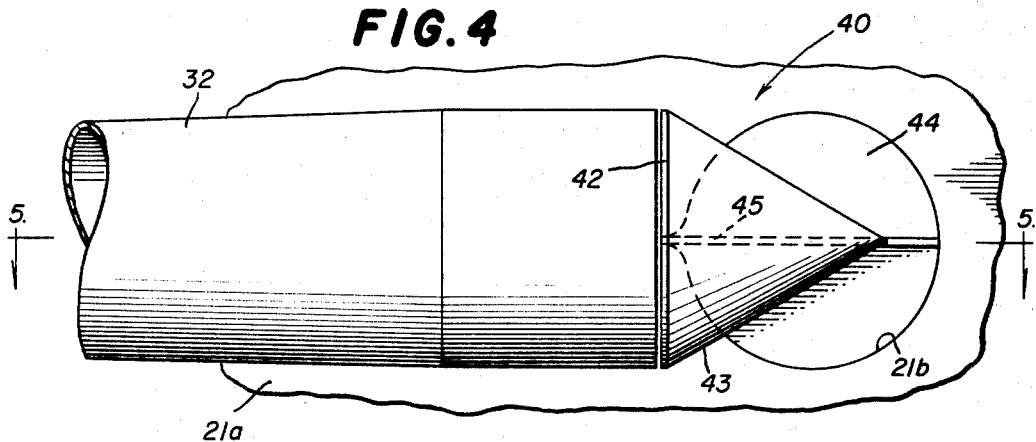
FIG. 4 is an enlarged bottom view, partly broken away, of parts of the aircraft, as shown in the enclosed area 4 in FIG. 2.
Figure 5:
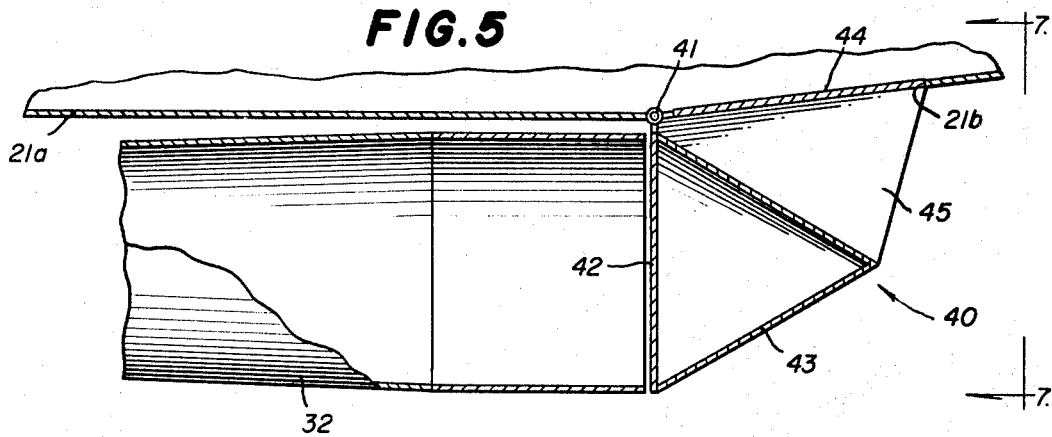
FIG. 5 is an enlarged longitudinal sectional view of the parts mentioned, this view being taken in the direction of the arrows along the line 5—5 in FIG. 4.
Figure 6:
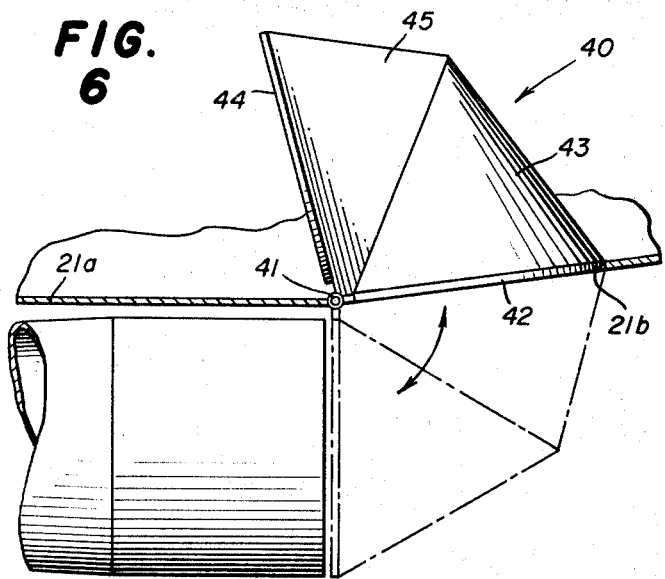
FIG. 6 is an enlarged side elevational view, partly in section, of the parts mentioned, as shown in FIG. 5.
Figure 7:
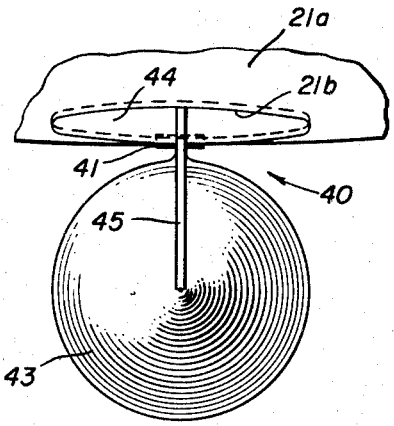
FIG. 7 is a fragmentary enlarged rear end view of the parts mentioned, this view being taken in the direction of the arrows along the line 7—7 in FIG. 5.

As best shown in FIGS. 2 and 4 to 7, inclusive, the exhaust gases tail pipe 32 of each engine 30 is provided with cooperating fairing structure 40 that is mounted upon the adjacent bottom wall 21a of the fuselage 21 for selective movements between active and storage positions. Specifically, the fairing structure 40 is mounted upon the fuselage bottom wall 21a by a hinge mechanism 41 and adjacent to a substantially circular opening 21b formed in the fuselage bottom wall 21. More particularly, the fairing structure 40 comprises a first substantially circular door 42, a connected cone-shaped fairing element 43, a second substantially circular door 44, and a fin 45 interconnecting the wall of the element 43 and the door 44, the two doors 42 and 44 being substantially of the same size and also the same size as the opening 21b formed in the fuselage bottom wall 21a. Also the planes of the two doors 42 and 44 are angularly displaced with respect to each other at an angle slightly in excess of 90°. When the fairing structure 40 is rotated about the hinge mechanism 41 into its active position, as illustrated in FIGS. 4 and 5, the door 42 is arranged in closing relation with the open rear end of the exhaust gases tail pipe 32, the element 43 is disposed in fairing relation with the rear end of the exhaust gases tail pipe 32, the door 44 is arranged in closing relation with the opening 21b in the fuselage bottom wall 21a, the structure 40, as a whole, is disposed exteriorly of the fuselage 21, and the fin 45 depends from the door 44 and supports the element 43 and the door 42. When the fairing structure 40 is rotated about the hinge mechanism 41 into its storage position, as illustrated in FIGS. 6 and 7, the door 42 is arranged in open relation with the open rear end of the exhaust gases tail pipe 32 and in closing relation with the opening 21b in the fuselage bottom wall 21a, the element 43 is disposed in non-fairing relation with the rear end of the exhaust gases tail pipe 32, the element 43 and the door 44 are positioned within the fuselage 21, the structure 40, as a whole, is disposed interiorly of the fuselage 21, and the fin 45 extends upwardly and forwardly from the element 43 and supports the door 44.

Figure 9:
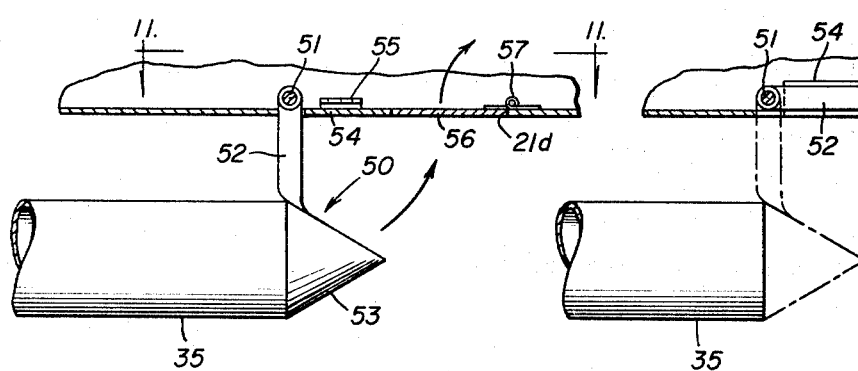
FIG. 9 is an enlarged longitudinal sectional view of the parts mentioned, this view being taken in the direction of the arrows along the line 9—9 in FIG. 8.
Figure 10:
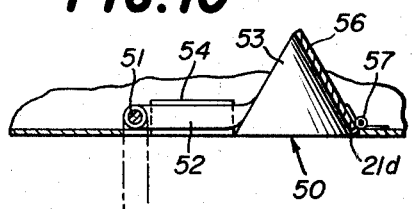
FIG. 10 is another enlarged longitudinal sectional view, similar to FIG. 9, of the parts mentioned.
Figure 11:
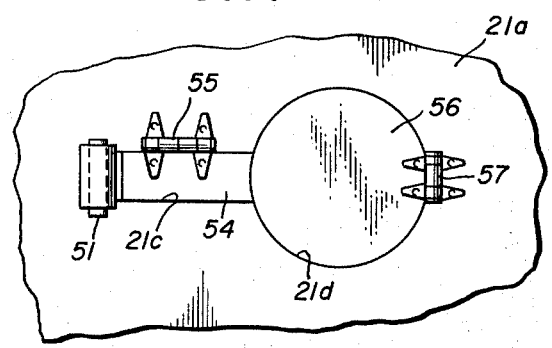
FIG. 11 is an enlarged fragmentary plan view of the parts mentioned, this view being taken in the direction of the arrows along the line 11—11 in FIG. 9.

As best shown in FIGS. 2 and 8 to 11, inclusive, each intake air tube 35 of each engine 30 is provided with cooperating fairing structure 50 that is mounted upon the adjacent bottom wall 21a of the fuselage 21 for selective movements between active and storage positions. Specifically, the fairing structure 50 is mounted upon the fuselage bottom wall 21a by a hinge mechanism 51 and adjacent to two connected openings 21c and 21d formed in the fuselage bottom wall 21a, the opening 21c being of rectangular configuration, and the opening 21d being substantially circular. More particularly, the fairing structure 50 comprises an arm 52, and a cone-shaped fairing element 53, one end of the arm 52 being connected to the hinge mechanism 51, and the other end of the arm 52 being connected to the wall of the element 53. The opening 21c is normally closed by a cooperating substantially rectangular door 54 that is mounted upon the fuselage bottom wall 21a by hinge mechanism 55 arranged normally to bias the door 54 into its closed position with respect to the opening 21c. The opening 21d is normally closed by a cooperating substantially circular door 56 that is mounted upon the fuselage bottom wall 21a by hinge mechanism 57 arranged normally to bias the door 56 into its closed position with respect to the opening 21d. In the arrangement, the configurations of the doors 54 and 56 susbtantially match those of the respective openings 21c and 21d; and the doors pivot inwardly into the fuselage about the repective hinge mechanisms 55 and 57. When the fairing structure 50 is rotated about the hinge mechanism 51 into its active position, as illustrated in FIGS. 8, 9 and 11, the enlarged end of the element 53 is arranged in closing relation with the open rear end of the intake air tube 35, the element 53 is disposed in fairing relation with the rear end of the intake air tube 35, the structure 50, as a whole, is disposed exteriorly of the fuselage 21, and the doors 54 and 56 are respectively biased by the hinge mechanisms 55 and 57 into their closed positions with respect to the respective openings 21c and 21d. When the fairing structure 50 is rotated about the hinge mechanism 51 into its storage position, as illustrated in FIG. 10, the enlarged end of the element 53 is arranged in open relation with the open rear end of the intake air tube 35 and in closing relation with the opening 21d in the fuselage bottom wall 21a, the element 53 is disposed in non-fairing relation with the rear end of the intake air tube 35, the arm 52 is disposed within the fuselage 21 forcing the door 54 into open position with respect to the opening 21c and against the bias of the hinge mechanism 55, and the element 53 is disposed within the fuselage 21 forcing the door 56 into open position with respect to the opening 21d and against the bias of the hinge mechanism 57.

Figure 12:
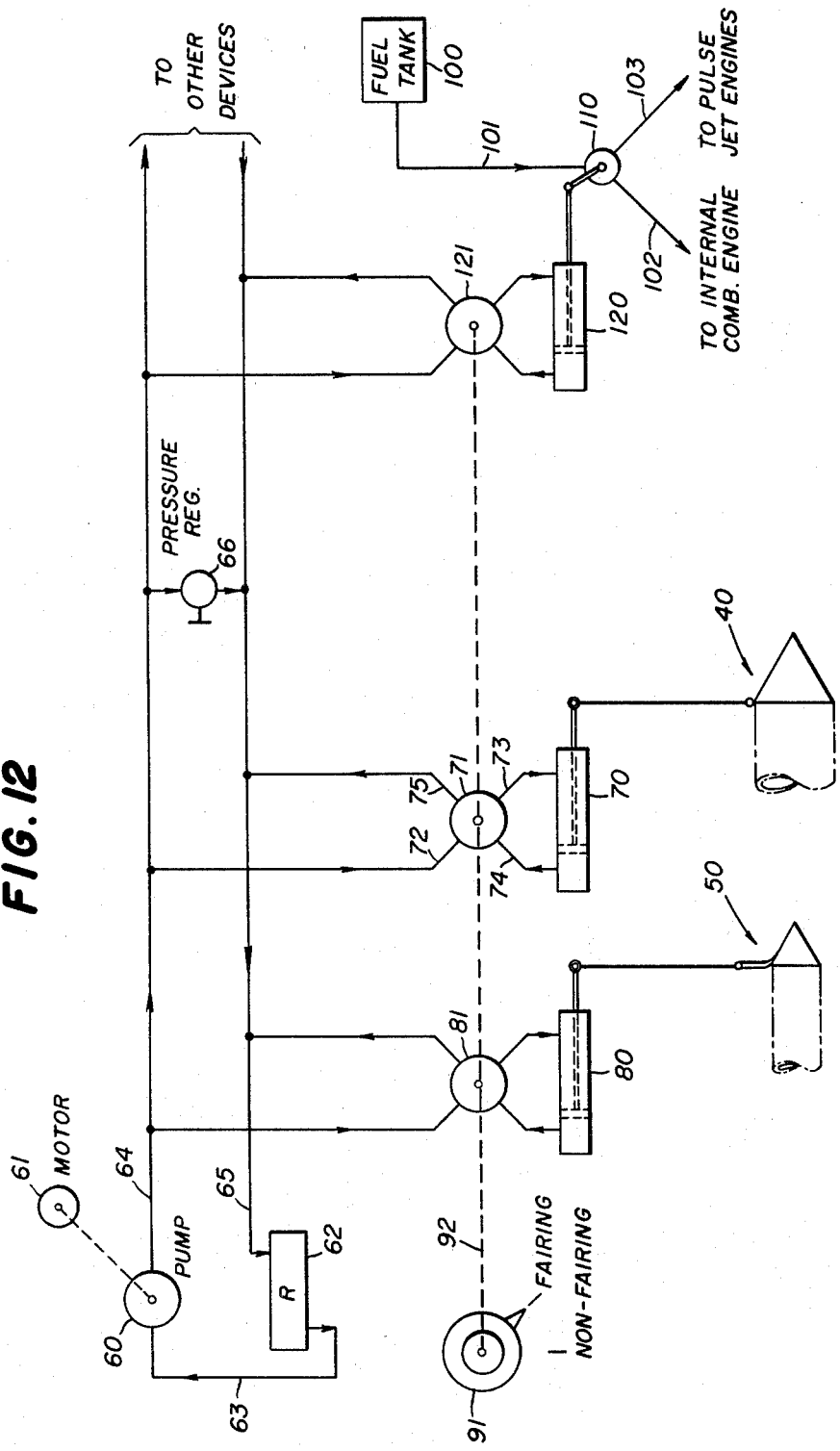
FIG. 12 is a diagrammatic illustration of the arrangement for selectively operating certain elements of the aircraft, including the parts, as shown in FIGS. 4 to 7, inclusive, and also the parts, as shown in FIGS. 8 to 11, inclusive.

Referring now to FIG. 12, there is illustrated a fluid or hydraulic control system for selectively operating the fairings 40 and 50 between their respective active and storage positions and in substantial unison; which system essentially comprises a fluid pump 60 that is driven by a suitable drive motor 61, a fluid reservoir 62, a pipe 63 connecting the reservoir 62 to the suction inlet of the pump 60, a high-pressure or supply line 64 connected to the pressure outlet of the pump 60, a lower pressure or return line 65 connected to the reservoir 62, and a pressure regulator 66. Operation of the drive motor 61 causes the pump to draw the fluid from the reservoir 62 through the pipe 63 and to supply the same under relatively high pressure into the supply line 64; and the pressure regulator effects the return of a regulated amount of the fluid from the supply line 64 to the return line 65; whereby the fluid is returned to the reservoir 62 for recirculation by the pump 60. The pressure regulator is manually adjustable to maintain any desired pressure within a predetermined range of pressures in the supply pipe 64; which action is effected simply by controlling the pressure at which the fluid is bypassed through the pressure regulator 66 from the supply line 64 into the return line 65.

Also, the system comprises two fluid motors of the piston-cylinder type, only one of which is illustrated at 70, operatively connected respectively to the two fairing structures 40, four fluid motors of the piston-cylinder type, only one of which is illustrated at 80, operatively connected respectively to the four fairing structures 50, two rotary control valves, only one of which is illustrated at 71, operatively connected commonly to the lines 64 and 65 and operatively connected respectively to the two fluid motors 70, etc., and four rotary control valves, only one of which is illustrated at 81, operatively connected commonly to the lines 64 and 65 and operatively connected respectively to the four fluid motors 80, etc. Further, the system comprises a manually rotatable member or knob 91 having "Fairing" and "Non-Fairing" positions, as illustrated, and a common operating shaft 92 connecting together the knob 91 and the rotors, not shown, of the two valves 71, etc., and the four valves 81, etc. When the knob 91 is rotated into its "Fairing" position, all of the valves 71, etc., 81, etc., are operated into their fairing positions; and when the knob 91 is rotated into its "Non-Fairing" position, all of the valves mentioned are operated into their non-fairing positions.

When the valve 71 is operated into its fairing position, the high-pressure inlet 72 thereof is connected to the outlet 73 thereof and the inlet 74 thereof is connected to the low-pressure outlet 75 thereof; whereby the supply line 64 is connected to the right-hand end of the fluid motor 71 and the left-hand end of the fluid motor 70 is connected to the return line 65; whereby the fluid motor 70 is contracted to move the fairing structure 40 into its active or fairing position illustrated. When the valve 71 is operated into its non-fairing position, the high-pressure inlet 72 thereof is connected to the outlet 74 thereof and the inlet 73 thereof is connected to the low-pressure outlet 75 thereof; whereby the supply line 64 is connected to the left-hand end of the fluid motor 70 and the right-hand end of the fluid motor 70 is connected to the return line 65; whereby the fluid motor 70 is expanded to move the fairing structure 40 into its storage position, not illustrated.

The construction and arrangement of the other fluid motor, not shown, that is operatively connected to the other fairing 40, not shown, are the same as those of the fluid motor 70; whereby the two fairing structures 40 are operated in unison and simultaneously with each other into their respective active and storage positions. Similarly, the construction and arrangement of the fluid motor 80 are the same as those of the fluid motor 70; whereby the fairing structure 50 is operated in unison and simultaneously with the two fairing structures 40. Likewise, the construction and arrangement of the other three fluid motors, not shown, that are respectively operatively connected to the other three fairing structures 50, not shown, are the same as those of the fluid motor 80; whereby the four fairing structures 50 are operated in unison and simultaneonsly with each other into their respective active and storage positions. Thus: when the knob 91 is operated into its "Fairing" position, the two fairing structures 40 and the four fairing structures 50 are simultaneously operated into their respective active positions; and when the knob 91 is operated into its "Non-Fairing" position, the two fairing structures 40 and the four fairing structures 50 are simultaneously operated into their respective storage positions.

Further, the aircraft 10 comprises a fuel tank 100, normally containing gasoline; and the fluid control system further comprises a rotary two-position valve 110 provided with an inlet connected by a pipe 101 to the fuel tank 100 and two outlets respectively connected to two pipes 102 and 103. The pipe 102 extends to the carburetor, not shown, of the main engine 25; and pipe 103 extends commonly to the fuel injection nozzles, not shown, of the auxiliary engines 30. Thus: gasoline is supplied from the fuel tank 100 to the main engine 25, when the valve 110 occupies its normal position; and gasoline is supplied from the fuel tank 100 to the auxiliary engines 30, when the valve 110 occupies its abnormal position. At this point, it is noted that the aircraft 20 is normally operated by the main engine 25; whereby the normal position of the valve 110 connects the fuel tank 100 to the main engine 25 via the pipe 102.

Further, the valve 110 is selectively operated by a fluid motor 120 of the piston-cylinder type that is selectively controlled by a rotary control valve 121 that is operatively connected to the supply line 64 and the return line 65. The rotor of the valve 121 is also connected to the operating shaft 92; whereby the valve 121 is selectively operated by the knob 91 and in unison with the valves 71, etc., 81, etc. Specifically, when the knob 91 is rotated into its "Fairing" position, the valve 121 is operated into its normal position contracting the fluid motor 120 to operate the valve 110 into its normal position to connect the fuel tank 100 to the main engine 25; and when the knob 91 is rotated into its "Non-Fairing" position, the valve 121 is operated into its abnormal position expanding the fluid motor 120 to operate the valve 110 into its abnormal position to connect the fuel tank 100 to the auxiliary engines 30.

As previously mentioned, the aircraft 20 is normally operated by the main engine 25, whereby the knob 91 is normally operated into its "Fairing" position, with the result that the fairings 40 and 50 are operated into fairing relation with the auxiliary engines 30 and gasoline is supplied from the fuel tank 100 to the main engine 25. When the aircraft 20 is in flight and it is desired to operate the same by the auxiliary engines 30, the knob 91 is operated into its "Non-Fairing" position, with the result that the fairings 40 and 50 are operated into non-fairing relation with the auxiliary engines 30 and gasoline is supplied from the fuel tank 100 to the auxiliary engines 30. When the aircraft 20 is operated by the main engine 25, there is a great economy in the use of gasoline and the drag exerted by the auxiliary engines 30 upon the fuselage 21 is greatly minimized. However, in the event of failure of the main engine 25, the aircraft 20 may be operated by operation of the auxiliary engines 30; whereby the knob 91 is operated into its "Non-Fairing" position, with the results that the fairings 40 and 50 are operated "out of the way" of the operations of the auxiliary engines 30 and into their storage positions in the fuselage 21, so as to minimize the drag exerted thereby upon the fuselage 21. At this point, it is mentioned that at any time the aircraft 20 is in flight, the auxiliary engines 30 may be employed to operate the aircraft; however, it is mentioned that an internal combustion engine of given power rating is normally more efficient in operation than a pulse jet engine of the same rating. Thus, in the foregoing discussion, it has been assumed that normally the aircraft 20 will be operated by the main engine 25, so that it is normally driven by the propeller 26.

In view of the foregoing, it is apparent that there has been provided in an aircraft normally operated by a propeller driven by a main engine of any conventional type, an improved arrangement of auxiliary engines of the pulse-jet type that can be brought quickly into operation in the event of failure of the main engine; whereby the pilot may maintain the flight speed of the aircraft long enough to effect a safe landing thereof. Moreover, in the arrangement, fairings are operatively associated with the auxiliary engines and are selectively moved between fairing and non-fairing positions with respect to the auxiliary engines, as required, the fairings being operated into non-fairing positions with the auxiliary engines when the auxiliary engines are not in use so as to minimize the drag exerted by the auxiliary engines upon the fuselage of the aircraft when the aircraft is operated by the propeller driven by the main engine.

The pulse jet type of engine is substantially ideally suited for use as the auxiliary engine or as the emergency power plant in the aircraft, since it is of exceedingly simple construction and arrangement and has a very low initial cost. Moreover, the normal high rate of fuel utilization of the auxiliary engine of the pulse-jet type is of no practical importance, as it is contemplated that the auxiliary engine will be only operated on an emergency basis in the event of mechanical failure of the main engine, as previously explained.

While there has been described what is at present considered to be the preferred embodiment of the invention, it will be understood that various modifications may be made therein, and it is intended to cover in the appended claims all such modifications as fall within the true spirit and scope of the invention.

I claim:

1. In an aircraft including an elongated longitudinally extending fuselage, laterally extending wing structure carried by said fuselage, and a main engine mounted in said fuselage; the combination comprising first and second auxiliary engines fixedly mounted on said fuselage exteriorly thereof and disposed in the air stream of said aircraft in flight, first and second fairings adapted respectively selectively to cooperate with said auxiliary engines, means mounting both of said fairings for individual selective movements between active and storage positions, said first fairing in its active position being disposed exteriorly of said fuselage and in fairing relation with said first auxiliary engine, said first fairing in its storage position being disposed interiorly of said fuselage and in non-fairing relation with said first auxiliary engine, said second fairing in its active position being disposed exteriorly of said fuselage and in fairing relation with said second auxiliary engine, said second fairing in its storage position being disposed interiorly of said fuselage and in non-fairing relation with said second auxiliary engine, a controller selectively operative between two positions, and means governed by operation of said controller into one of its positions for moving said fairings into their respective active positions and governed by operation of said controller into the other of its positions for moving said fairings into their respective storage positions.

2. In an aircraft including an elongated longitudinally extending fuselage, laterally extending wing structure carried by said fuselage, and a main engine mounted in said fuselage; the combination comprising an auxiliary engine fixedly mounted on said fuselage exteriorly thereof and disposed in the air stream of said aircraft in flight, said fuselage having an opening therein disposed adjacent to said auxiliary engine, a fairing adapted selectively to cooperate with said auxiliary engine, means mounting said fairing upon said fuselage adjacent to said opening for selective movements between active and storage positions, said fairing in its active position being projected through said opening out of said fuselage and into fairing relation to said auxiliary engine, said fairing in its storage position being withdrawn through said opening into said fuselage and into non-fairing relation with said auxiliary engine, and means for selectively moving said fairing between its active and storage positions.

3. In an aircraft including an elongated longitudinally extending fuselage, and laterally extending wing structure carried by said fuselage; the combination comprising an engine carried by said fuselage exteriorly thereof and disposed in the air stream of said aircraft in flight, said fuselage having a opening therein disposed adjacent to said engine, a fairing adapted selectively to cooperate with said engine, means mounting said fairing upon said fuselage adjacent to said opening for selective movements between active and storage positions, said fairing including two spaced-apart door structures arranged selectively to cooperate with said opening in said fuselage, said fairing in its active position being projected through said opening out of said fuselage and into fairing relation to said engine and said first door structure being in closed relation to said opening, said fairing in its storage position being withdrawn through said opening into said fuselage and into non-fairing relation with said engine and said second door structure being in closing relation to said opening, and means for selectively moving said fairing between its active and storage positions.

4. In an aircraft including an elongated longitudinally extending fuselage, and laterally extending wing structure carried by said fuselage; the combination comprising an engine carried by said fuselage exteriorly thereof and disposed in the air stream of said aircraft in flight, said fuselage having an opening therein disposed adjacent to said engine, a door operatively associated with said opening in said fuselage, means mounting said door for selective movements between open and closed positions with respect to said opening, means biasing said door into its closed position, a fairing adapted selectively to cooperate with said engine, means mounting said fairing upon said fuselage adjacent to said opening for selective movements between active and storage positions, said fairing in its active position being projected through said opening out of said fuselage and into fairing relation with said engine, said fairing in its storage position being withdrawn through said opening into said fuselage and into non-fairing relation with said engine, said door being moved outwardly in said fuselage from its open into its closed position by the bias of said biasing means and in response to movement of said fairing into its active position, said door being moved inwardly in said fuselage from its closed position into its open position against the bias of said biasing means and in response to movement of said fairing into its storage position, and means for selectively moving said fairing between its active and storage positions.

5. In an aircraft including an elongated longitudinally extending fuselage, and a laterally extending wing structure carried by said fuselage; the combination comprising an engine carried by said fuselage exteriorly thereof and disposed in the air stream of said aircraft in flight, said engine being of the pulse jet type including intake air nozzle structure and exhaust gas nozzle structure, said fuselage having first and second openings therein disposed respectively adjacent to said intake air nozzle structure and said exhaust gas nozzle structure, first and second fairings adapted respectively selectively to cooperate with said engine, means mounting both of said fairings for individual selective movements between active and storage positions, a door operatively associated with said first openings in said fuselage, means mounting said door for selective mounting between open and closed positions with respect to said first opening, means biasing said door into its closed position, said first fairing in its active position being disposed exteriorly of said fuselage and in closing position with said intake air nozzle structure and in fairing relation with said engine, said first fairing in its storage position being disposed interiorly of said fuselage and in opening position with said intake air nozzle structure and in non-fairing relation with said engine, said door being moved inwardly in said fuselage from its closed position into its open position against the bias of said biasing means and in response to movement of said first fairing into its closed position, said door being moved outwardly in said fuselage from its open position into its closed position by the bias of said biasing means and in response to movement of said fairing into its active position, said second fairing including two spaced-apart door structures arranged selectively to cooperate with said second opening in said fuselage, said second fairing in its active position being disposed exteriorly of said fuselage and in closing position with said exhaust gas nozzle structure and in fairing relation with said engine, said second fairing in its storage position being disposed interiorly of said fuselage and in opening position with said exhaust gas nozzle structure and in non-fairing relation with said engine, the first of said door structures closing said second opening when said second fairing occupies its active position and the second of said door structures closing said second opening when said second fairing occupies its storage position, a controller selectively operative between two positions, and means governed by operation of said controller into one of its positions for moving said fairings into their respective active positions and governed by operation of said controller into the other of its positions for moving said fairings into their respective storage positions.

References Cited
UNITED STATES PATENTS

| | | | |
|---|---|---|---|
| 2,437,353 | 3/1948 | Gliwa | 244—130 X |
| 3,134,561 | 5/1964 | Clejan | 244—58 |
| 3,273,654 | 9/1966 | Pinnes | 244—58 X |

FERGUS S. MIDDLETON, *Primary Examiner.*

MILTON BUCHLER, *Examiner.*

B. BELKIN, *Assistant Examiner.*